(12) United States Patent
Harich et al.

(10) Patent No.: US 12,085,062 B2
(45) Date of Patent: Sep. 10, 2024

(54) METHOD FOR OPERATING A WIND TURBINE, COOLING SYSTEM AND WIND TURBINE

(71) Applicant: Nordex Energy SE & Co. KG, Hamburg (DE)

(72) Inventors: Martin Harich, Tornesch (DE); Joachim Nitzpon, Steffenshagen (DE); Florian Adler, Hamburg (DE); Moritz Dreher, Hamburg (DE); Björn Albertsen, Hamburg (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 18/451,473

(22) Filed: Aug. 17, 2023

(65) Prior Publication Data
US 2024/0060477 A1    Feb. 22, 2024

(30) Foreign Application Priority Data
Aug. 18, 2022    (EP) ..................... 22190951

(51) Int. Cl.
| | | |
|---|---|---|
| *F03D 80/60* | (2016.01) | |
| *F03D 7/04* | (2006.01) | |
| *F03D 80/70* | (2016.01) | |

(52) U.S. Cl.
CPC ............. *F03D 80/601* (2023.08); *F03D 7/04* (2013.01); *F03D 80/70* (2016.05);
(Continued)

(58) Field of Classification Search
CPC .. F03D 80/60; F05B 2260/20; F05B 2260/64; F05B 2240/14
See application file for complete search history.

(56) References Cited

U.S. PATENT DOCUMENTS 8,360,715 B2 * 1/2013 Matsuo .................... F03D 80/40
                                                                            415/176
8,511,989 B2 * 8/2013 Matsushita ............. F03D 80/60
                                                                             416/37
(Continued)

FOREIGN PATENT DOCUMENTS

| CN | 106640555 A | 5/2017 |
| CN | 105221360 B | 7/2020 |

(Continued)

OTHER PUBLICATIONS

Extended European Search Report of the European Patent Office dated Feb. 14, 2023 for European application 22190951.8 on which this application is based.

*Primary Examiner* — Justin D Seabe
(74) *Attorney, Agent, or Firm* — Walter Ottesen, P.A.

(57) ABSTRACT

A method is for operating a wind turbine. The wind turbine includes a nacelle including a nacelle component, in particular a rotor bearing, and a nacelle air flow influencing unit. The nacelle air flow influencing unit is configured to influence an air flow entering, flowing through and/or exiting the nacelle. The method includes: determining an operating condition of the nacelle component, determining a cooling demand of the nacelle component dependent on the determined operating condition of the nacelle component, controlling an operation of the nacelle air flow influencing unit dependent on the cooling demand of the nacelle component to adapt the air flow to the cooling demand of the nacelle component.

20 Claims, 3 Drawing Sheets

(52) U.S. Cl.
CPC . *F05B 2260/201* (2013.01); *F05B 2270/3032* (2013.01); *F05B 2270/327* (2013.01)

(56) References Cited

U.S. PATENT DOCUMENTS

| | | | |
|---|---|---|---|
| 11,060,510 B2* | 7/2021 | Airoldi | ............ F03D 80/60 |
| 2010/0061853 A1 | 3/2010 | Bagepalli | |
| 2010/0133824 A1 | 6/2010 | Gao | |
| 2011/0080001 A1 | 4/2011 | Gundtoft et al. | |
| 2013/0257052 A1* | 10/2013 | Ha | ............ F03D 80/60 |
| | | | 290/44 |
| 2023/0349366 A1* | 11/2023 | Edenfeld | ............ F03D 80/60 |

FOREIGN PATENT DOCUMENTS

| | | | |
|---|---|---|---|
| CN | 113202703 A | 8/2021 | |
| CN | 114658616 A | 6/2022 | |
| EP | 2 163 761 A1 | 3/2010 | |
| EP | 2 302 214 A2 | 3/2011 | |
| EP | 2 309 122 A1 | 4/2011 | |

* cited by examiner

METHOD FOR OPERATING A WIND TURBINE, COOLING SYSTEM AND WIND TURBINE

CROSS-REFERENCE TO RELATED APPLICATIONS

This application claims priority of European patent application no. 22190951.8, filed Aug. 18, 2022, the entire content of which is incorporated herein by reference.

TECHNICAL FIELD

The disclosure relates to a method for operating a wind turbine, in particular for controlling the cooling of a nacelle component. The disclosure further relates to a cooling system for a wind turbine. The disclosure further relates to a wind turbine, in particular to a wind turbine including a cooling system.

BACKGROUND

A wind turbine may include a rotor that includes a rotatable rotor hub assembly having multiple rotor blades. The rotor blades transform wind energy into a drive torque that drives a generator via a drive train.

SUMMARY

It is desirable to provide a method for operating a wind turbine, wherein the method provides a reliable operation of the wind turbine. It is further desirable to provide a cooling system for a wind turbine which provides reliable cooling. It is further desirable to provide a wind turbine that enables reliable operation.

Embodiments of the disclosure provide a method for operating a wind turbine. The wind turbine includes a nacelle including a nacelle component. For example, the nacelle component includes a rotor bearing or is a rotor bearing. Alternatively or in addition, the nacelle component for example includes or is a gearbox, a converter, a generator or another component which is installed inside the nacelle. The wind turbine includes a nacelle air flow influencing unit. The nacelle air flow influencing unit is configured to influence an air flow. For example, the nacelle air flow influencing unit is configured to influence the speed, the flow rate and/or the direction of the air flow. For example, the air flow is an air flow entering the nacelle, in particular an ambient air flow entering the nacelle. According to a further example, the air flow is an air flow flowing through the nacelle. According to a further embodiment, the air flow is an air flow exiting the nacelle. Also different combinations of an air flow entering, flowing through and exiting the nacelle are possible. Physically speaking, the air flow entering, flowing through and/or exiting the nacelle cools the nacelle interior as well as component(s) located inside the nacelle.

A method includes the following method steps:
- determining an operating condition of the nacelle component,
- determining a cooling demand of the nacelle component dependent on the determined operating condition of the nacelle component,
- controlling an operation of the nacelle air flow influencing unit dependent on the cooling demand of the nacelle component to adapt the air flow to the cooling demand of the nacelle component.

The nacelle air flow influencing unit is controlled dependent on the cooling demand of the nacelle component. According to some embodiments, the controlling of the operation can be dependent on additional parameters.

The method enables the interior of the nacelle and in particular the nacelle component to be cooled, dependent on the actual needs of the nacelle component in view of its operating condition.

For example, the nacelle component is a rotor bearing which needs to be cooled. By cooling the rotor bearing according to its operating condition, the temperature inside the rotor bearing and thus the lubrication film thickness in the rotor bearing is maintained in a desirable range. The risk of failure of the rotor bearing is thus decreased and its expected lifetime is increased. In another example, the component is an electrical component which needs to be cooled. By cooling the electrical component according to its operating condition, the electrical component is operated in a safe and reliable manner. In particular, failure due to overheating of the electrical component can be prevented.

According to an embodiment, a load condition of a load acting on the rotor bearing is determined, in particular an axial load condition. The operating condition of the rotor bearing is determined dependent on the determined load condition. According to this embodiment, the operation of the nacelle air flow influencing unit is thus controlled indirectly dependent on the determined load condition. The cooling of the rotor bearing can therefore be adapted before the rotor bearing becomes too hot. For example, the cooling of the rotor bearing can be activated or increased in situations of high load which, for example, would otherwise lead to high temperatures of the rotor bearing. In other words, this embodiment enables an anticipative cooling of the rotor bearing, before the rotor bearing becomes too hot.

According to further embodiments, the load condition is determined based on a power generated by the wind turbine and/or a wind speed acting on a rotor of the wind turbine. Thus, it is not necessary to directly measure the load acting on the rotor bearing. Instead, the load condition can be determined based on variables which are already available from a wind turbine control system, on variables measured by sensors present in the wind turbine and/or based on known values. For example, the load condition includes a radial load condition of a radial load acting on the rotor bearing and/or an axial load condition of an axial load acting on the rotor bearing. For example, the radial load and/or radial load condition is estimated based on the rotor weight, while the axial load and/or the axial load condition is determined by an estimation formula based on the wind speed and on a mechanical power of the rotor, wherein the mechanical power is calculated based on an electrical power generated by the wind turbine. In another example, the radial load and/or radial load condition as well as the axial load and/or the axial load condition are determined based on characteristic curves which are for example obtained by calculations for different wind speeds. In particular, the characteristic curves can be obtained by interpolating a plurality of points, wherein each point results from a calculation for a specific wind speed. For example, the load condition is determined based on a ratio between the axial load and the radial load.

According to further embodiments, a rotation speed of the rotor of the wind turbine is determined. The operating condition of the rotor bearing is determined dependent on the determined rotation speed of the rotor. Thus, a controlling of the nacelle air flow influencing unit dependent on the rotation speed is possible. For example, a higher rotation speed needs more cooling of the rotor bearing. The rotor bearing can thus be cooled before it heats up. For example, the operating condition of the rotor bearing is determined dependent on the rotation speed and on the load condition of the load acting on the rotor bearing. The nacelle air flow influencing unit can thus be controlled based on an extensive overview of the operating condition of the rotor bearing.

According to further embodiments, the operating condition of the rotor bearing is determined dependent on a comparison between the determined load condition and at least one predefined load condition threshold. For example, a determined load condition below the predefined threshold indicates no particular cooling demand. An operating condition above the predefined threshold, for example, indicates an additional cooling demand to lower the risk of overheating. It is also possible to have more than one threshold, for example to realize different cooling demands.

According to further embodiments, a component temperature of the nacelle component is determined. The operating condition of the nacelle component is determined based on a comparison between the determined component temperature and at least one predefined temperature threshold. For example, if the component temperature is below the predefined temperature threshold, no additional cooling is necessary. If the component temperature is above the predefined temperature threshold, the air flow influencing unit is controlled to activate or increase the cooling of the nacelle component and thus to lower the component temperature. In the case of more than one predefined temperature threshold, different degrees of cooling can be realized.

According to further embodiments, the method includes:
determining a further operating condition, the further operating condition being of a further nacelle component arranged in the interior of the nacelle, in particular one of a gearbox, a converter and a generator,
determining a cooling demand of the further nacelle component dependent on the determined further operating condition,
controlling the operation of the nacelle air flow influencing unit dependent on the cooling demand of the further operating condition.

The method allows controlling of the nacelle air flow influencing unit depending on different nacelle components. In particular, it is possible to control the operation of the nacelle air flow influencing unit in accordance with the cooling demand of the nacelle component having the highest cooling demand. Thereby it can be ensured that none of the nacelle components suffers from overheating.

The method is of course not limited to the case in which only one further nacelle component is taken into consideration. The method may also be extended to a case in which a plurality of further nacelle components need to be taken into consideration.

According to further embodiments, an air temperature in the interior of the nacelle is determined. The operation of the nacelle air flow influencing unit is controlled dependent on the determined air temperature in the interior of the nacelle. In addition or as an alternative, an ambient air temperature outside of the nacelle is determined. The operation of the nacelle air flow influencing unit is controlled dependent on the determined ambient air temperature outside of the nacelle. Thus, the temperature inside the nacelle and/or the ambient air temperature can be considered to determine the cooling demand and to control the operation of the nacelle air flow influencing unit.

According to an embodiment, a cooling system for a wind turbine includes a control unit. The control unit is configured to execute a method for operating the wind turbine as described herein. The cooling system includes a nacelle air flow influencing unit. The nacelle air flow influencing unit is configured to influence the air flow entering, flowing through and/or exiting a nacelle of the wind turbine. Thus, the cooling system allows a cooling of the nacelle component which is adapted to its cooling demand.

According to further embodiments, the nacelle air flow influencing unit includes a nacelle air flow enhancing device, in particular a nacelle fan. The nacelle air flow enhancing device is located at an air outlet assembly of the nacelle and is configured to draw air out of the nacelle. Alternatively or in addition, the nacelle air flow enhancing device is located in an air inlet assembly of the nacelle and is configured to blow air into the nacelle. Thus, the air flow enhancing device, for example, is configured to push hot air out of the nacelle or to suck cool air into the nacelle. For example, the air flow enhancing device enhances the speed and/or the flow rate of the air flow.

The air inlet assembly for example is an opening in the nacelle housing. Additionally, the nacelle air inlet assembly may include air piping and may be arranged to accommodate an air flow limiting device and a flow guiding device.

The air outlet assembly for example is an opening in the nacelle housing. Additionally, the nacelle air outlet assembly may include air piping and may be arranged to accommodate an air flow limiting device and a flow guiding device.

According to further embodiments, the nacelle air flow influencing unit includes a nacelle air flow limiting device, in particular a shutter device. For example, the shutter device is configured to let in and/or limit the amount of air that gets into the nacelle or out of the nacelle. For example, the shutter device can be more or less opened or closed to influence the flow rate of the air flow. For example, the nacelle air flow limiting device is located at an air inlet assembly of the nacelle and is configured to selectively limit the amount of air entering into the nacelle. As an alternative or in addition, the nacelle air flow limiting device is located at an air outlet assembly of the nacelle and is configured to selectively limit the amount of air exiting the nacelle. With the nacelle air flow limiting device a natural air flow through the nacelle can be influenced. Alternatively or in addition, the air flow caused by the nacelle air flow enhancing device can be influenced by the air flow limiting unit.

The nacelle air flow influencing unit, for example, includes a nacelle air flow guiding device, in particular a moveable air flap or a directional control valve. The nacelle air flow guiding device is located at an air inlet assembly of the nacelle and is configured to selectively guide the air flow in the direction of one of the nacelle components, in particular the nacelle component with a cooling demand. It is also possible that the air flow influencing unit guides the air flow towards a specific area of one of the nacelle components. For example, the air flow influencing unit guides the air flow towards the lower part of the rotor bearing which undergoes the highest loads and has the highest cooling demand.

According to an embodiment, a wind turbine includes a nacelle and a cooling system as described herein. The nacelle air flow influencing unit of the cooling system is coupled with a nacelle housing. The wind turbine includes a nacelle component which is arranged in the interior of the nacelle. The cooling system is provided for cooling the nacelle component. For example, the nacelle component is a rotor bearing. The nacelle component can be any other component of the nacelle or inside the nacelle.

According to further embodiments, the nacelle includes a nacelle air inlet assembly to let in air. The nacelle includes a nacelle air outlet assembly to let out air. The nacelle air inlet assembly is arranged on a first side of the nacelle facing a rotor of the wind turbine. For example, the nacelle air inlet assembly is arranged on the windward side of the nacelle. The nacelle air outlet assembly is arranged on a second side of the nacelle facing away from the rotor. For example, the nacelle air outlet assembly is arranged on the lee side of the nacelle. The nacelle air flow influencing unit is arranged at the nacelle air inlet assembly and/or at the nacelle air outlet assembly.

Features and advantages of the described method also apply to the described cooling system and the described wind turbine and vice versa.

BRIEF DESCRIPTION OF DRAWINGS

The invention will now be described with reference to the drawings wherein.

DETAILED DESCRIPTION

Figure 1:
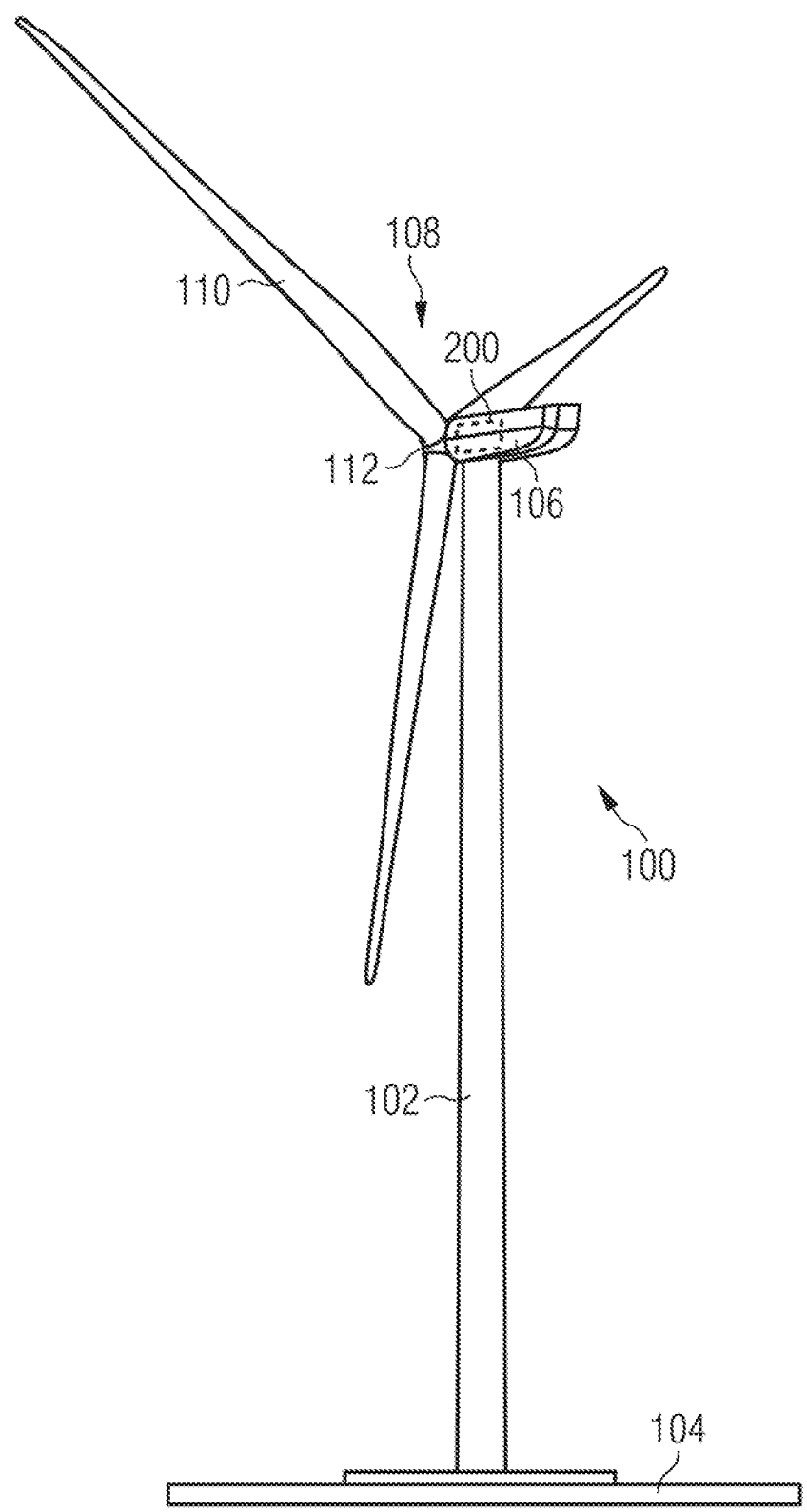
FIG. 1 is a schematic view of a wind turbine according to an embodiment.
Figure 2:
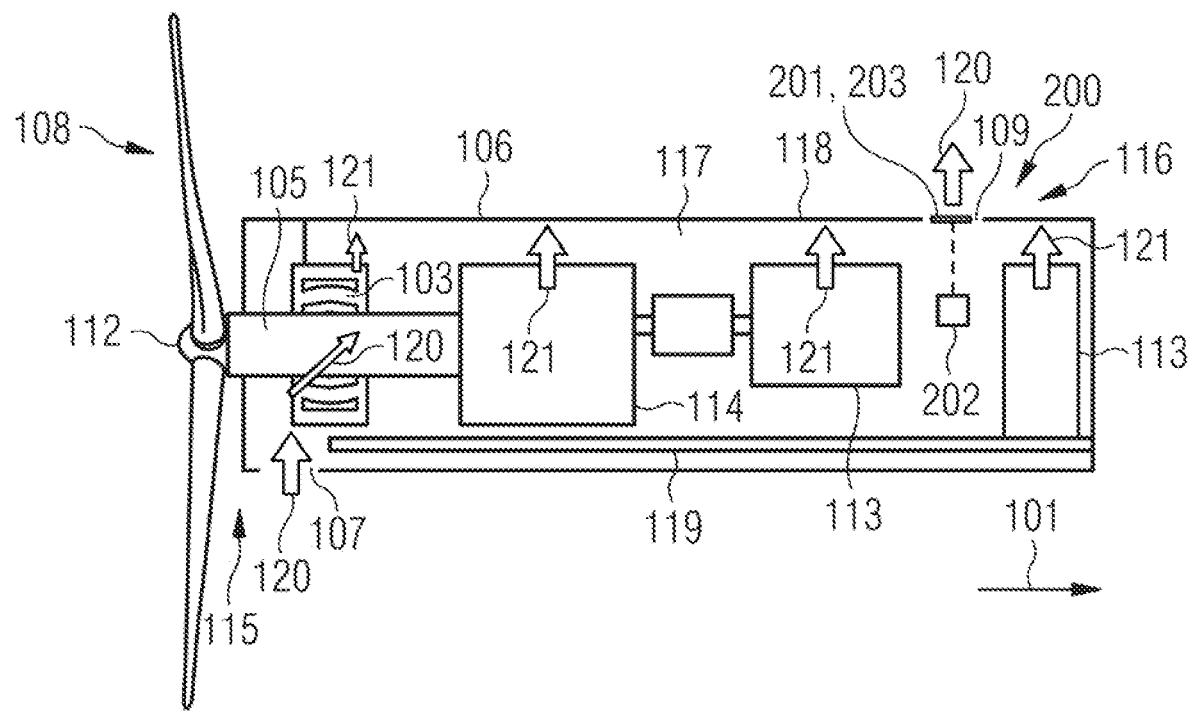
FIG. 2 is a schematic view of a nacelle according to an embodiment.

As shown in FIG. 1, a wind turbine 100 includes a tower 102. The tower 102 is connected to a foundation 104 fixed on a ground. The foundation 104 is formed on and supported by the ground. On a top end of the tower 102 opposite to the foundation 104 a nacelle 106 is arranged. The nacelle 106 houses the drive train. Inside the nacelle 106, for example, a generator is arranged which is connected via the drive train with a rotor 108, the drive train including, for example, a gearbox and a rotor shaft 105 (FIG. 2). The rotor 108 includes several rotor blades 110. The rotor blades 110 are mounted on a rotor hub 112. The rotor hub 112 is connected to the rotor shaft 105.

The rotor 108 is driven in operation by an airflow, for example wind. The rotational movement of the rotor 108 is transmitted via the drive train to the generator. The generator converts the energy of the rotor 108 into electrical energy.

FIG. 2 schematically shows the nacelle 106. The nacelle 106 includes a nacelle housing 118 which surrounds an interior 117 of the nacelle. A component carrier 119 of the nacelle is arranged facing the tower 102. The nacelle housing 118 includes a nacelle air inlet assembly 107. For example, the nacelle air inlet assembly 107 includes a nacelle opening with a filter. The nacelle air inlet assembly 107 includes an opening in the nacelle housing 118 which is configured to let in air, for example in a floor region of the nacelle housing 118. According to an embodiment shown in FIG. 2, the nacelle air inlet assembly 107 is arranged at a first side 115 along an axial direction 101. The axial direction 101 is the axial direction of the rotor shaft 105. The first side 115 is the side of the nacelle 106 which faces the rotor 108.

On a second side 116, which faces away from the rotor 108 along the axial direction 101, a nacelle air outlet assembly 109 is arranged. For example, the nacelle air outlet assembly includes an opening in the nacelle housing 118, in particular with a filter. The nacelle air outlet assembly 109 is configured to let out air. In the embodiment shown in FIG. 2, the nacelle air outlet assembly 109 is arranged in an upper area or ceiling of the nacelle housing 118. Other locations for the nacelle air inlet assembly 107 and/or the nacelle air outlet assembly 109 are possible.

An air flow 120 flows through the nacelle 106, in particular through the interior 117. For example, the air flow 120 enters the interior 117 through the nacelle air inlet assembly 107 and exits the nacelle 106 through the nacelle air outlet assembly 109.

Different nacelle components 103, 113, 114 are arranged in the interior 117. For example the nacelle component 103 is a rotor bearing. The rotor shaft 105 is held and rotatably supported by the rotor bearing 103.

According to embodiments, the rotor shaft 105 is held and rotatably supported by more than one rotor bearing 103, for example by two rotor bearings or more.

The nacelle component 113 for example includes electrical components like a converter or a generator. The nacelle component 114 for example includes mechanical components like a gearbox. Other components are possible as well. In particular, the nacelle components 103, 113, 114 heat up during operation. For example, the rotor bearing 103 heats up during operation due to loads. Thus, heat 121 is emitted by the nacelle components 103, 113, 114.

The nacelle includes a cooling system 200 to adapt the air flow 120 through the nacelle 106 to cool the nacelle components 103, 113, 114. It is also possible that just one of the nacelle components 103, 113, 114 should be cooled by the cooling system 200.

The cooling system 200 includes a nacelle air flow influencing unit 201. The nacelle air flow influencing unit 201 is connected to the control unit 202. The control unit 202 is configured to operate the nacelle air flow influencing unit 201 such that the air flow 120 is adapted depending on a cooling demand of at least one of the nacelle components 103, 113, 114.

In the example shown in FIG. 2, the nacelle air influencing unit includes a nacelle air flow enhancing device 203 which includes a fan or consists of a fan. The fan can be controlled by the control unit 202 to blow air out of the interior 117 such that the air flow 120 absorbing waste heat 121 is blown outside.

The nacelle air flow influencing unit 201, for example, is the nacelle air flow enhancing device 203 which is the nacelle fan. The nacelle fan 203 is electrically driven and configured to suck air out of the interior 117. The control unit 202, for example, controls the speed of the fan 203 to control the speed of the air flow 120 and the flow rate of the air flow 120 which is blown out of the interior 117. The air which enters into the interior 117 through the nacelle air inlet assembly 107 takes the heat 121 and the heated air is blown out of the interior 117 by the nacelle fan 203. Thereby, the air flow 120 cools down the nacelle interior 117 and in particular the nacelle components 103, 113, 114. For example, the controlling of the operation of the nacelle fan 203 corresponds to an activating and deactivating of the nacelle fan 203. Thus, the nacelle fan 203 includes two operation modes: on, off.

According to further embodiments, the nacelle fan 203 has more than two operating modes, for example different speeds, or the fan speed is continuously variable. The control unit 202 controls the nacelle air flow enhancing device 203 depending on a cooling demand, for example on a cooling demand of the nacelle component 203 and/or a cooling demand of the nacelle component 113 and/or the nacelle component 114. For example, the cooling demand is determined based on operating conditions of the nacelle components 103, 113, 114. If the control unit 202 determines a cooling demand of the nacelle component 103, 113, 114, the control unit 202 controls the nacelle air flow influencing unit 201, for example the nacelle fan 203, such that the air flow 120 cools the nacelle components 103, 113, 114. For example, by controlling the operation of the nacelle air flow influencing unit 201 such that it generates a high speed air flow 120, a high cooling of the nacelle component 103, 113, 114 is realized.

Figure 3:
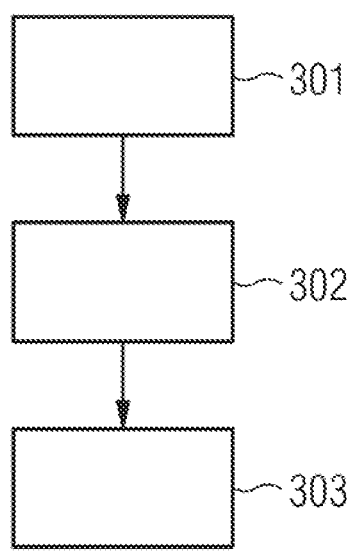
FIG. 3 is a schematic view of flowchart of a method according to an embodiment; and, FIGS. 4 and 5 are schematic views of nacelles according to embodiments.

FIG. 3 shows a flowchart of a method for cooling at least one of the nacelle components 103, 113, 114.

In a step 301 an operating condition of the nacelle component 103, 113, 114 is determined. For example, the operating condition is determined based on a determined load condition of a load acting on the rotor bearing 103, in particular an axial load condition. Thereby a potential heating of the rotor bearing 103 can be determined before the rotor bearing 103 actually heats up above a critical level.

For example, the axial load and/or axial load condition is determined based on a power generated by the wind turbine and/or on a wind speed. The operating condition can also be determined based on a rotation speed of the rotor and/or a rotation speed of the rotor shaft 105. A heating of the rotor bearing 103 and/or mechanical components 114 and/or electrical components 113 is also dependent on the rotation speed and/or the power generated by the wind turbine 100. It is not necessary to directly measure the axial load. Instead, the axial load can be determined based on variables which are already available from the wind turbine control system.

For example, the operating condition is classified based on the comparison between the determined operating condition and at least one predefined threshold into one of a plurality of classes, wherein each class corresponds to a cooling demand. For example, an operation condition below the predefined threshold indicates no particular cooling demand. An operation condition above the predefined threshold for example indicates that an additional cooling demand should be applied.

In a step 302 the cooling demand of the nacelle component 103, 113, 114 is determined based on the determined operating condition. For example, the cooling demand class is determined based on the determined operation condition. In particular, the cooling demand is determined before the respective nacelle component 103, 113, 114 actually heats up. Thus, prescient measures are possible to start the cooling of the components before critical heat conditions are reached.

In a step 303, the nacelle air flow influencing unit 201 is controlled dependent on the determined cooling demand of step 302. Thus, the air flow 120 is generated that corresponds to the cooling demand of the nacelle component 103, 113, 114. For example, the rotor bearing 103 is cooled down in high load conditions or in high temperature situations. Thereby, the lubrication regime of the rotor bearing 103 is improved by maintaining the lubrication film thickness in a desirable range. Thus, the bearing functionality of the rotor bearing 103 is improved.

The cooling system 200 with the described method allows more and/or higher rated electrical components 113 and higher loads compared to conventional wind turbines 100 without the cooling system 200. Higher loads and more and/or higher rated electrical components 113 lead to more heat 121 during operation. The cooling system 200 dissipates this heat and thus prevents overheating of the nacelle components 103, 113, 114. The nacelle air flow influencing unit 201 is not only controlled by the nacelle temperature, the nacelle air flow influencing unit 201 in particular is controlled dependent on the cooling demand which is determined depending on the operation condition.

Specific operating conditions trigger the cooling system 200 such that the nacelle air flow influencing unit 201 is operated to increase the air flow 120. Certain known load situations lead to a heating of specific nacelle components 103, 113, 114. For example, full production with normal wind speed leads to a heating of the rotor bearing 103. Thus, if the operation condition corresponding to full production with normal wind speed is determined, the nacelle air flow influencing unit 201, in particular the nacelle fan 203, is started to generate the air flow 120. This start of the nacelle component fan 203 is done before the rotor bearing 103 heats up and a critical temperature of the rotor bearing 103 is thus avoided. This is because the heating of the rotor bearing 103 is slower than the determination of the operating condition, the determination of the cooling demand and the corresponding controlling of the nacelle air flow influencing unit 201.

According to an embodiment, the nacelle air flow influencing unit 201 is operated to stop or influence the air flow 120 to end the cooling effect, in particular if one of a component temperature and a temperature inside the nacelle 106 is below a predefined temperature threshold. This prevents the temperature from becoming too low, which also could affect the functionality and, for example, the distribution of the lubricant in the rotor bearing 103.

Figure 4:
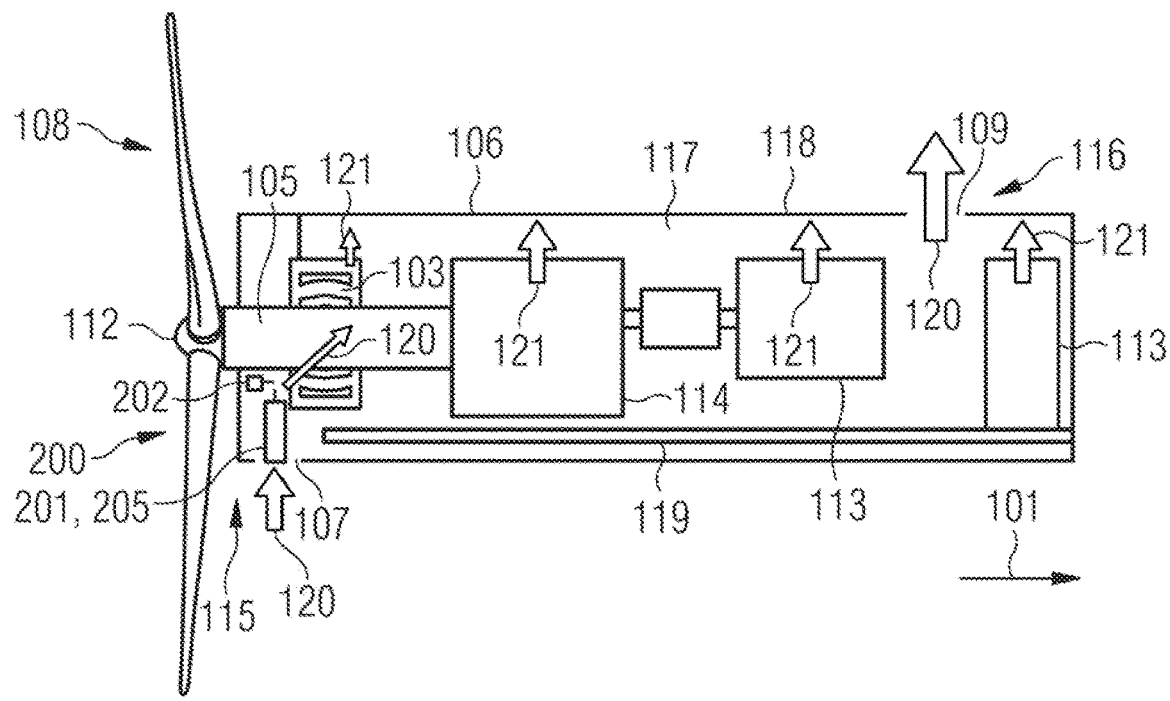

FIG. 4 schematically shows the nacelle 106 according to a further embodiment. The embodiment of FIG. 4 essentially corresponds to the embodiment explained in connection with FIG. 2. In contrast, the nacelle air flow influencing unit 201 includes a nacelle air flow enhancing device 205 which is arranged at the nacelle air inlet assembly 107. The nacelle air outlet assembly 109 does not include a fan. The nacelle air flow enhancing device 205 for example includes a nacelle fan or consists of a nacelle fan. The nacelle air flow enhancing device 205 is coupled to the control unit 202 and controlled by the control unit 202. The nacelle fan 205 is configured to blow air into the interior 117 to generate the air flow 120. The air flow 120 exits the interior 117 through the nacelle air outlet assembly 109, which is for example an opening in the nacelle housing 118.

It is also possible to have the nacelle air flow enhancing device 203 at the nacelle air outlet assembly 109 together with the nacelle air flow enhancing device 205 at the air inlet assembly 107. This, for example, would be a combination of the embodiments of FIGS. 2 and 4.

Figure 5:
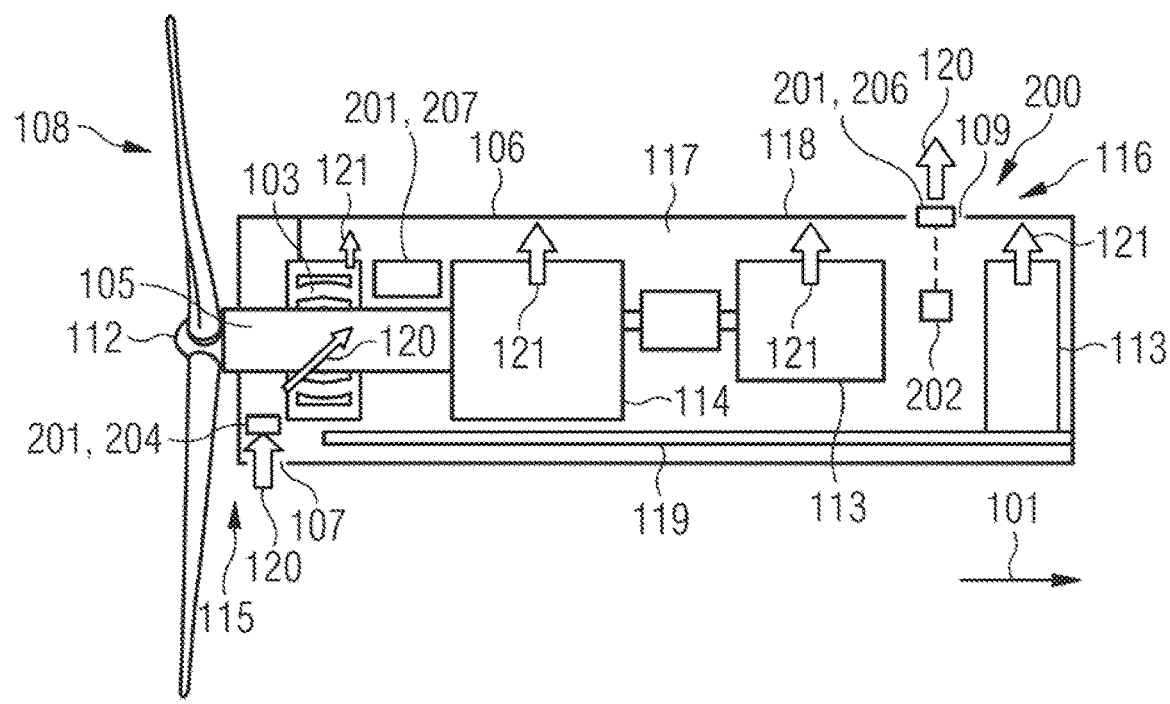

FIG. 5 schematically shows an embodiment of the nacelle 106 according to a further embodiment. The embodiment of FIG. 5 essentially corresponds to the embodiments of FIGS. 2 and 4. In contrast, the cooling system 200 of the embodiment of FIG. 5 does not include the nacelle air flow enhancing device 203 and/or the nacelle air flow enhancing device 205. Instead, the cooling system 200 includes a nacelle air flow limiting device 204. For example, the nacelle air flow limiting device 204 is configured to influence the flow rate of the air flow 120. For example, the nacelle air flow limiting device 204 is a shutter device or consists of a shutter device arranged at the nacelle air inlet assembly 107. A nacelle air flow limiting device 206, which for example includes a shutter device or consists of a shutter device, is arranged at the nacelle air outlet assembly 109. For example, only one of the nacelle air flow limiting devices 204, 206 is arranged. It is also possible to combine the nacelle air flow limiting devices 204, 206 with the nacelle air flow enhancing devices 203, 205 in any combination. Thus, a combination of the embodiment of FIG. 2 with the nacelle air flow limiting device 204 and/or the nacelle air flow limiting device 206 is possible as well as a combination of the embodiment of FIG. 4 with the nacelle air flow limiting device 204 and/or the nacelle air flow limiting device 206. In any of these embodiments the nacelle air flow influencing unit 201 can include a nacelle air flow guiding device 207. It is also possible that the nacelle air flow influencing unit 201 consists only of the nacelle air flow guiding device 207 and includes no fan or shutter device. The nacelle air flow guiding device for example includes a moveable air flap, a directional control valve or any other device that is configured to influence the air flow 120. For example, the nacelle air flow guiding device 207 is configured to influence the direction of the air flow 120 inside the interior 117 of the nacelle 106.

The nacelle air flow limiting devices 204, 206 and the nacelle air flow guiding device 207 are each configured to influence the natural air flow 120 and/or the air flow 120 caused or enhanced by the air flow enhancing devices 203, 205. The air flow limiting devices 204, 206 for example are configured for limiting the air flow 120 entering and/or exiting the nacelle 106 and therefore can be referred to as passive air flow influencing units. The natural air flow 120 flows through the nacelle without any additional actuation. The air flow limiting devices 204, 206 and the air flow guiding device 207 are for example configured to influence the flow rate and/or the direction of the air flow 120.

The shutter device 206 can be, for example, a type of sliding door which can be more or less opened or closed in order to let in more or less air in the nacelle. The shutter device 204, 206 thereby enables the control of the amount of air flow 120 through the nacelle depending on the operating condition of the nacelle component 103, 113, 114. For example, in a first operating condition where no cooling is wanted, the shutter device 204, 206 is closed. In a second operating condition where some cooling is demanded, the shutter device 204, 206 is half opened. In a third operating condition in which a high amount of cooling is demanded, the shutter device 204, 206 is completely open. Of course different or additional settings are possible.

The cooling system 200 according to the different embodiments and combinations thereof enables a cooling which is adapted to the actual needs of the rotor bearing 103 and/or other nacelle components 103, 113, 114. Thereby the risk of failure can be decreased. For example in the rotor bearing 103 the lubrication film thickness decreases with rising temperatures. The film thickness is critical to the lifetime and risk of failure. By, for example, cooling the rotor bearing 103 before it reaches a critical temperature, the film thickness of the lubricant can be kept at a level which enables a reliable lubrication and therefore leads to an increase in lifetime and a decrease in the risk of failure of the rotor bearing 103. This also applies correspondingly to the other nacelle components 103, 113, 114, which can also be operated more reliably if overheating is avoided at an early stage.

It is understood that the foregoing description is that of the preferred embodiments of the invention and that various changes and modifications may be made thereto without departing from the spirit and scope of the invention as defined in the appended claims.

REFERENCE SIGNS 100 wind turbine
101 axial direction
102 tower
103 nacelle component, rotor bearing
104 foundation
105 rotor shaft
106 nacelle
107 nacelle air inlet assembly
108 rotor
109 nacelle air outlet assembly
110 rotor blade
112 rotor hub
113 further component, electrical component
114 further component, mechanical component
115 first side
116 second side
117 interior
118 nacelle housing
119 component carrier
120 air flow
121 heat
200 cooling system
201 nacelle air flow influencing unit
202 control unit
203 nacelle air flow enhancing device, nacelle fan
204 nacelle air flow limiting device
205 nacelle air flow enhancing device
206 nacelle air flow limiting device
207 nacelle air flow guiding device
301-303 method steps

The invention claimed is:

1. A method for operating a wind turbine, wherein the wind turbine includes a nacelle having a nacelle component and a nacelle air flow influencing unit, wherein the nacelle air flow influencing unit is configured to influence an air flow which is at least one of entering, flowing through and exiting the nacelle, the method comprising:
    determining an operating condition of the nacelle component;
    determining a cooling demand of the nacelle component dependent on the determined operating condition of the nacelle component;
    controlling an operation of the nacelle air flow influencing unit dependent on the cooling demand of the nacelle component to adapt the air flow to the cooling demand of the nacelle component;
    determining a load condition of a load acting on a rotor bearing; and,
    determining the operating condition of the rotor bearing dependent on the determined load condition.

2. The method of claim 1, wherein said determining the load condition of a load acting on the rotor bearing is based on at least one of a power generated by the wind turbine and a wind speed acting on a rotor of the wind turbine.

3. The method of claim 1, wherein the load acting on the rotor bearing is an axial load condition.

4. The method of claim 1 further comprising:
    determining a rotation speed of a rotor of the wind turbine; and,
    determining the operating condition of the rotor bearing dependent on the determined rotation speed of the rotor.

5. The method of claim 1 further comprising determining the operating condition of the rotor bearing dependent on a comparison between the determined load condition and at least one predefined load condition threshold.

6. The method of claim 1 further comprising:
    determining a component temperature of the nacelle component; and, determining the operating condition of the nacelle component dependent on a comparison between the determined component temperature and at least one predefined temperature threshold.

7. The method of claim 1 further comprising:
determining a further operating condition, the further operating condition being of a further nacelle component arranged in an interior of the nacelle;
determining a cooling demand of the further nacelle component dependent on the determined further operating condition; and,
controlling the operation of the nacelle air flow influencing unit dependent on the cooling demand of the further operating condition.

8. The method of claim 7, wherein the further nacelle component is one of a gearbox, a converter, and a generator.

9. The method according to claim 7, wherein the operation of the nacelle air flow influencing unit is controlled in accordance with the cooling demand of the nacelle component having a highest cooling demand.

10. The method of claim 1 further comprising:
determining at least one of an air temperature in an interior of the nacelle and an ambient air temperature outside of the nacelle; and,
controlling the operation of the nacelle air flow influencing unit dependent on at least one of the determined air temperature in the interior of the nacelle and on the determined ambient air temperature outside of the nacelle.

11. The method of claim 1, wherein the nacelle component is a rotor bearing.

12. A cooling system for a wind turbine including a nacelle having a nacelle component, the cooling system comprising:
a control unit;
a nacelle air flow influencing unit configured to influence an air flow which is at least one of entering, flowing through, and exiting the nacelle of the wind turbine; and,
said control unit being configured to:
determine an operating condition of the nacelle component;
determine a cooling demand of the nacelle component dependent on the determined operating condition of the nacelle component;
control an operation of the nacelle air flow influencing unit dependent on the cooling demand of the nacelle component to adapt the air flow to the cooling demand of the nacelle component;
determine a load condition of a load acting on a rotor bearing; and,
determine the operating condition of the rotor bearing dependent on the determined load condition.

13. The cooling system of claim 12, wherein:
said nacelle air flow influencing unit includes a nacelle air flow enhancing device;
said nacelle air flow enhancing device is at least one of:
located at an air outlet assembly of the nacelle and configured to draw air out of the nacelle; and,
located at an air inlet assembly of the nacelle and configured to blow air into the nacelle.

14. The cooling system of claim 13, wherein said nacelle air flow enhancing device is a nacelle fan.

15. The cooling system of claim 12, wherein:
said nacelle air flow influencing unit includes a nacelle air flow limiting device;
said nacelle air flow limiting device is located at least at one of:
an air inlet assembly of the nacelle and is configured to selectively limit an amount of air entering into the nacelle; and,
an air outlet assembly of the nacelle and is configured to selectively limit the amount of air exiting the nacelle.

16. The cooling system of claim 15, wherein said nacelle air flow limiting device is a shutter device.

17. The cooling system of claim 12, wherein:
said nacelle air flow influencing unit includes a nacelle air flow guiding device; and,
said nacelle air flow guiding device is located at an air inlet assembly of the nacelle and is configured to selectively guide the air flow in at least one of a direction of one of the nacelle components and a direction of a specific area of one of the nacelle components.

18. The cooling system of claim 17, wherein said nacelle air flow guiding device is a moveable air flap or a directional control valve.

19. A wind turbine, comprising:
a nacelle having a housing and defining an interior;
a nacelle component being arranged in said interior of said nacelle;
a cooling system including a control unit and a nacelle air flow influencing unit;
said nacelle air flow influencing unit configured to influence an air flow which is at least one of entering, flowing through, and exiting the nacelle of the wind turbine; and,
said control unit being configured to:
determine an operating condition of the nacelle component;
determine a cooling demand of the nacelle component dependent on the determined operating condition of the nacelle component;
control an operation of the nacelle air flow influencing unit dependent on the cooling demand of the nacelle component to adapt the air flow to the cooling demand of the nacelle component;
determine a load condition of a load acting on a rotor bearing; and,
determine the operating condition of the rotor bearing dependent on the determined load condition;
said nacelle air flow influencing unit being coupled with said nacelle housing; and,
said cooling system being provided for cooling said nacelle component.

20. The wind turbine of claim 19 further comprising:
a rotor;
said nacelle including a nacelle air inlet assembly to let in air and a nacelle air outlet assembly to let out air;
said nacelle air inlet assembly being arranged on a first side of said nacelle facing said rotor and the nacelle air outlet assembly being arranged on a second side of said nacelle facing away from said rotor; and,
said nacelle air flow influencing unit being arranged at least at one of said nacelle air inlet assembly and said nacelle air outlet assembly.

* * * * *